(12) United States Patent
Saito

(10) Patent No.: US 12,175,144 B2
(45) Date of Patent: Dec. 24, 2024

(54) INFORMATION PROCESSING APPARATUS THAT DISPLAYS INFORMATION INDICATING WHETHER DIFFERENT FUNCTIONS ARE AVAILABLE IN DIFFERENT REGIONS OF A SELECTION SCREEN, CONTROL METHOD, AND STORAGE MEDIUM

(71) Applicant: CANON KABUSHIKI KAISHA, Tokyo (JP)

(72) Inventor: Nao Saito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/491,842

(22) Filed: Oct. 23, 2023

(65) Prior Publication Data

US 2024/0176562 A1 May 30, 2024

(30) Foreign Application Priority Data

Nov. 24, 2022 (JP) .................................. 2022-187306

(51) Int. Cl.
*G06F 3/12* (2006.01)

(52) U.S. Cl.
CPC .......... *G06F 3/1239* (2013.01); *G06F 3/1205* (2013.01)

(58) Field of Classification Search
CPC .... G06F 3/1239; G06F 3/1205; G06F 3/1203; G06F 3/1219
See application file for complete search history.

(56) References Cited

U.S. PATENT DOCUMENTS

| 2004/0252337 | A1* | 12/2004 | Takabayashi | ...... H04N 1/00188 358/1.14 |
| 2005/0105129 | A1* | 5/2005 | Takahashi | .......... H04N 1/32529 358/1.15 |
| 2010/0208285 | A1* | 8/2010 | Takeya | .................. G06F 3/1255 358/1.13 |
| 2012/0274971 | A1* | 11/2012 | Tanabe | ............... G06K 15/4095 358/1.14 |
| 2014/0022579 | A1* | 1/2014 | Edamatsu | .......... G06K 15/1805 358/1.13 |
| 2014/0218760 | A1* | 8/2014 | Murata | .................. G06F 3/1256 358/1.15 |

(Continued)

FOREIGN PATENT DOCUMENTS

JP 2017047590 A 3/2017

*Primary Examiner* — Iriana Cruz
(74) *Attorney, Agent, or Firm* — Venable LLP

(57) ABSTRACT

A technique for increasing user convenience is provided. An information processing apparatus includes a determination unit configured to determine whether a predetermined function of the information processing apparatus has a use limitation, a setting unit configured to set information indicating a state relating to use of the predetermined function, and a display unit configured to display, on a display portion of the information processing apparatus, the information indicating the state relating to use of the predetermined function set by the setting unit, wherein in a case where it is determined by the determination unit that the predetermined function has a use limitation, the setting unit makes a setting such that the information indicating the state relating to use of the predetermined function includes information indicating that the predetermined function has a use limitation.

18 Claims, 9 Drawing Sheets

(56) References Cited

U.S. PATENT DOCUMENTS

| | | | |
|---|---|---|---|
| 2014/0281728 A1* | 9/2014 | Homma | G06F 11/2294 |
| | | | 714/37 |
| 2019/0286390 A1* | 9/2019 | Kajikawa | H04N 1/0048 |
| 2020/0319604 A1* | 10/2020 | Oshita | G04G 21/04 |
| 2021/0263692 A1* | 8/2021 | Ishizawa | B41J 29/393 |
| 2021/0303238 A1* | 9/2021 | Minamiyama | B41J 2/17543 |
| 2023/0359417 A1* | 11/2023 | Kamiya | G06F 3/12 |

* cited by examiner

● , ○ , ☐ , ✕   FIG. 7A

● : AVAILABLE WITHOUT RESTRICTION   FIG. 7B

○ : COMMUNICATION WITH CONTRACT SERVER IS POSSIBLE, AVAILABLE   FIG. 7C

⊗ : COMMUNICATION WITH CONTRACT SERVER IS POSSIBLE, UNAVAILABLE   FIG. 7D

☐ : COMMUNICATION WITH CONTRACT SERVER IS IMPOSSIBLE, AVAILABLE   FIG. 7E

☒ : COMMUNICATION WITH CONTRACT SERVER IS IMPOSSIBLE, UNAVAILABLE   FIG. 7F

789 : COMMUNICATION WITH CONTRACT SERVER IS
POSSIBLE, AVAILABLE FOR 789 SHEETS

6 : COMMUNICATION WITH CONTRACT SERVER IS
IMPOSSIBLE, AVAILABLE FOR SIX SHEETS

INFORMATION PROCESSING APPARATUS THAT DISPLAYS INFORMATION INDICATING WHETHER DIFFERENT FUNCTIONS ARE AVAILABLE IN DIFFERENT REGIONS OF A SELECTION SCREEN, CONTROL METHOD, AND STORAGE MEDIUM

BACKGROUND OF THE INVENTION

Field of the Invention

The present invention relates to an information processing apparatus, a control method, and a storage medium.

Description of the Related Art

There is known a form in which a so-called subscription contract in which, for example, a certain amount of money is paid according to the number of printed sheets per month is made between a service user and a service provider to use an image processing apparatus. Such an image processing apparatus communicates with a server device installed by the service provider to acquire contract information and notify usage information.

Japanese Patent Laid-Open No. 2017-047590 discloses a technique of stopping a service temporarily in a case where such an image processing apparatus cannot be connected to the server device for a certain period of time and displaying, on a display portion, a notification indicating that the service is temporarily stopped and a notification prompting connection with the server device.

However, in the technique disclosed in Japanese Patent Laid-Open No. 2017-047590, a user who is a service user can only recognize that the use of a function managed by the server device is stopped, and user convenience is low.

SUMMARY OF THE INVENTION

The present invention is made in view of the above problem and provides a technique for increasing user convenience.

In the first aspect of the present invention, there is provided an information processing apparatus including:
 a determination unit configured to determine whether a predetermined function of the information processing apparatus has a use limitation;
 a setting unit configured to set information indicating a state relating to use of the predetermined function; and
 a display unit configured to display, on a display portion of the information processing apparatus, the information indicating the state relating to use of the predetermined function set by the setting unit,
 wherein in a case where it is determined by the determination unit that the predetermined function has the use limitation, the setting unit makes a setting such that the information indicating the state relating to use of the predetermined function includes information indicating that the predetermined function has the use limitation.

In the second aspect of the present invention, there is provided a method of controlling an information processing apparatus, the method including:
 determining whether a predetermined function of the information processing apparatus has a use limitation;
 setting information indicating a state relating to use of the predetermined function; and
 displaying, on a display portion of the information processing apparatus, the information indicating the state relating to use of the predetermined function set in the setting,
 wherein in a case where it is determined in the determining that the predetermined function has the use limitation, a setting is made in the setting so that the information indicating the state relating to use of the predetermined function includes the information indicating that the predetermined function has the use limitation.

In the third aspect of the present invention, there is provided a non-transitory computer readable storage medium storing a program for causing a computer to perform a method of controlling an information processing apparatus, the method including:
 determining whether a predetermined function of the information processing apparatus has a use limitation;
 setting information indicating a state relating to use of the predetermined function; and
 displaying, on a display portion of the information processing apparatus, the information indicating the state relating to use of the predetermined function set in the setting,
 wherein in a case where it is determined in the determining that the predetermined function has the use limitation, a setting is made in the setting so that the information indicating the state relating to use of the predetermined function includes information indicating that the predetermined function has the use limitation.

According to the present invention, user convenience increases.

Further features of the present invention will become apparent from the following description of exemplary embodiments with reference to the attached drawings.

BRIEF DESCRIPTION OF THE DRAWINGS

FIGS. 7A to 7F are diagrams for explaining state display icons;

DESCRIPTION OF THE EMBODIMENTS

A detailed description will be given below of an example of an embodiment for an information processing apparatus, a control method, and a program with reference to the accompanying drawings. It should be noted that the following embodiments do not limit the present invention, and not all combinations of features described in the present embodiment are essential to the solution of a problem to be solved by the present invention. Further, the positions, shapes, and the like of constituents described in the embodiments are merely examples and are not meant to limit the scope of the present invention only to them.

Configuration of an Image Processing Apparatus

Figure 1A:
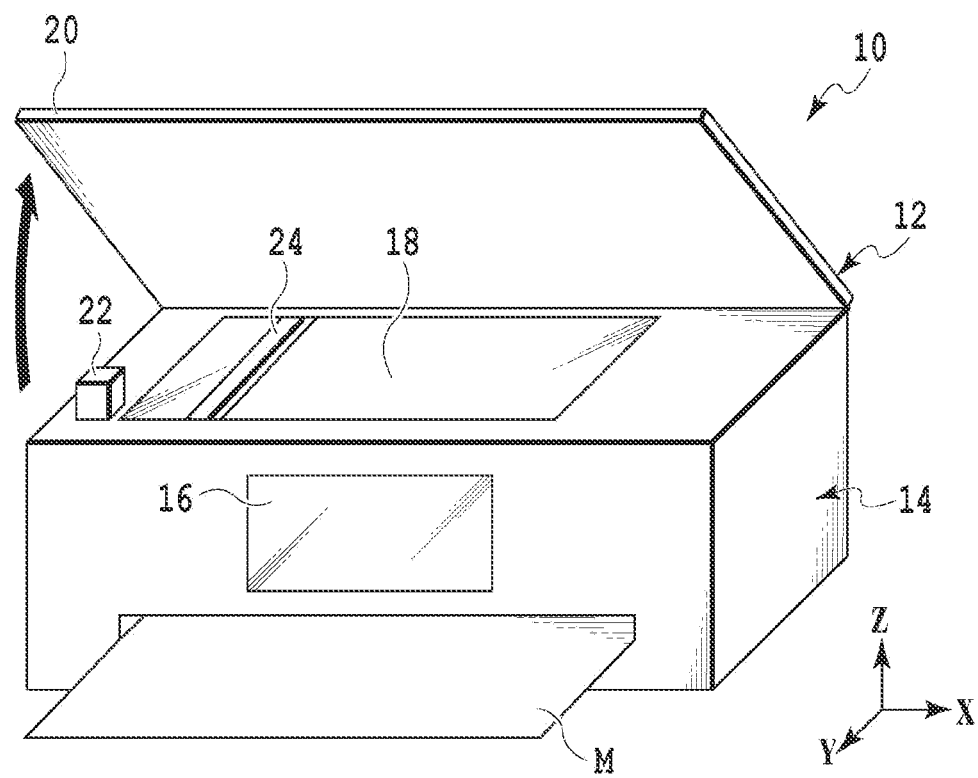
FIGS. 1A and 1B are schematic configuration diagrams of an image processing apparatus.
Figure 1B:
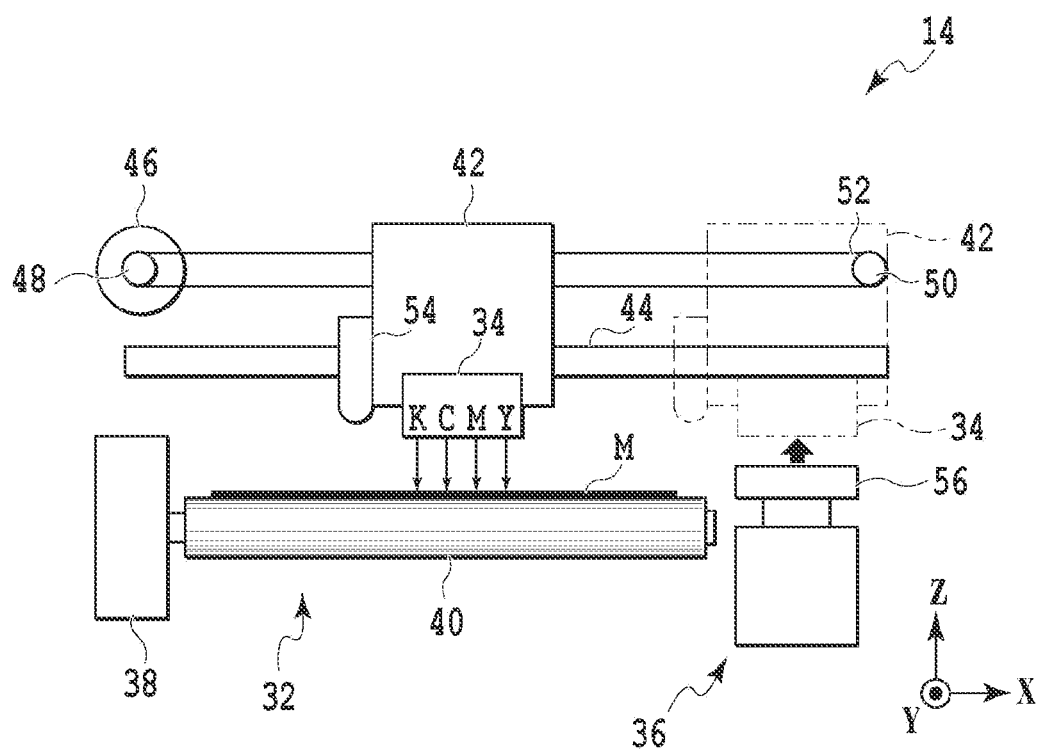

FIGS. 1A and 1B are schematic diagrams showing an image processing apparatus as an example of an information processing apparatus according to the present embodiment; FIG. 1A is an external view and FIG. 1B is a configuration diagram of a printing portion. The image processing apparatus described in the present embodiment can receive a specific service under a subscription contract. In the following description, the "subscription contract" will be simply referred to as "contract" as appropriate. The contents of the subscription contract are not specifically limited, but in the present embodiment, the subscription contract is a contract in which paying a flat monthly rate allows the use of each function of the image processing apparatus including printing up to the predetermined set number of sheets and makes automatic delivery of consumables such as an ink cartridge.

An image processing apparatus 10 in FIGS. 1A and 1B includes a reader 12 capable of reading a document placed on a platen 18, a printing portion 14 capable of printing a print medium M, and an operation (display) portion 16 capable of displaying information to a user and being operated by a user. The image processing apparatus 10 also includes a control portion 202, which will be described later, for controlling the overall operation.

The reader 12 is provided in an upper portion of the image processing apparatus 10. The reader 12 includes the platen 18 on which a document is placed, a cover 20 capable of covering the platen 18, a cover sensor 22 that detects the opening and closing of the cover 20, and a reading sensor 24 that reads an image or the like in a document placed on the platen 18. Since various publicly known techniques can be used for each constituent of the reader 12, detailed descriptions thereof will be omitted.

The operation portion 16 notifies a user of the state, functions, usage, and the like of the image processing apparatus 10 by displaying text, an illustration, or an explanation page on the Internet. The operation portion 16 also displays functions executable by the image processing apparatus 10 in a selectable manner. In a case where a user selects one of the functions, the image processing apparatus 10 executes the selected function. The operation portion 16 may be, for example, a liquid crystal display device having a touch panel function or may be configured to include operation keys and the like in addition to a display device.

The printing portion 14 is provided in a lower portion of the image processing apparatus 10. The printing portion 14 includes a conveyance portion 32 that conveys a print medium, a print head 34 that ejects ink onto a conveyed print medium M and performs printing, and a maintenance portion 36 that maintains and restores the ejection performance of the print head 34 satisfactorily. The conveyance portion 32 conveys the print medium M in a Y direction with a conveyance roller 40 driven by a conveyance motor 38.

The print head 34 is mounted on a carriage 42 capable of reciprocating in an X direction intersecting (in the present embodiment, perpendicular to) a conveyance direction in which the print medium M is conveyed. In the present embodiment, the print head 34 is configured to eject four colors of inks, black, cyan, magenta, and yellow. In the present embodiment, the printing portion 14 configured to include one print head 34 will be described. However, the printing portion 14 may include a plurality of print heads 34. The inks ejected from the print head 34 are not limited to the four colors of inks described above. Further, the print head 34 may be configured to be able to eject various liquids such as, for example, a processing liquid for processing an ink ejected onto the print medium M.

The carriage 42 is configured so that an ink tank (not shown) storing ink to be supplied to the print head 34 is detachable. In the present embodiment, a description will be given of the case of an on-carriage system in which the ink tank is mounted on the carriage 42. However, an off-carriage system in which ink is supplied to the print head 34 via a tube or the like from an ink tank installed separately from the carriage 42 may also be used.

The carriage 42 is slidably provided on a guide rail 44 extending in the X direction. The carriage 42 is further connected to a belt 52 endlessly stretched over a pulley 48 connected to the carriage motor 46 and a pulley 50 provided apart from the pulley 48. As a result, the carriage motor 46 is driven to rotate the belt 52, and the rotation of the belt 52 causes the carriage 42 connected to the belt 52 to move along the guide rail 44 in the X direction. Depending on the direction of rotation of the carriage motor 46, the carriage 42 moves from one side to the other side in the X direction or vice versa. At the time of the movement of the carriage 42 in the X direction, the control portion 202 applies a drive pulse to the print head 34, so that ink is ejected from the print head 34 and printing for one scan is performed.

The carriage 42 is also provided with a sensor 54 capable of reading an image printed on the printing medium M conveyed by the conveyance portion 32. The sensor 54 reads an image printed on the print medium M in a predetermined position by moving in the X direction via the carriage 42.

The printing portion 14 performs a printing operation in which ink is ejected onto the print medium M conveyed to a print start position by the conveyance portion 32 while the print head 34 is moved in the X direction via the carriage 42 to perform printing for one scan. After that, the printing portion 14 performs a conveyance operation in which the print medium M is moved by a predetermined amount by the conveyance portion 32 to put an area that has not yet been printed in a position facing the print head 34, and the printing operation is performed again. As described above, the printing portion 14 prints the printing medium M by alternately and repeatedly executing the printing operation and the conveyance operation.

The maintenance portion 36 is arranged within a movement area where the print head 34 can move via the carriage 42 and outside a print area where the print head 34 can print the print medium M. The maintenance portion 36 includes a cap 56 capable of capping and protecting the print head 34 located in a standby position at a time such as a time during which printing is not performed. The cap 56 caps an ejection port surface where an ejection port for ejecting ink is formed in the print head 34, thereby suppressing drying of ink at the ejection port, adhesion of dust to the ejection port surface, and the like. Although illustration is omitted, the maintenance portion 36 includes various publicly known constituents for executing a maintenance process of maintaining and restoring the ejection characteristics of the print head 34 satisfactorily, such as a wiper for wiping the ejection port surface and a suction portion for sucking ink from the ejection port. The maintenance process is executed at a predetermined time set in advance but can also be executed based on an input from a user through the operation portion 16.

Hardware Configuration of the Image Processing Apparatus

Figure 2:
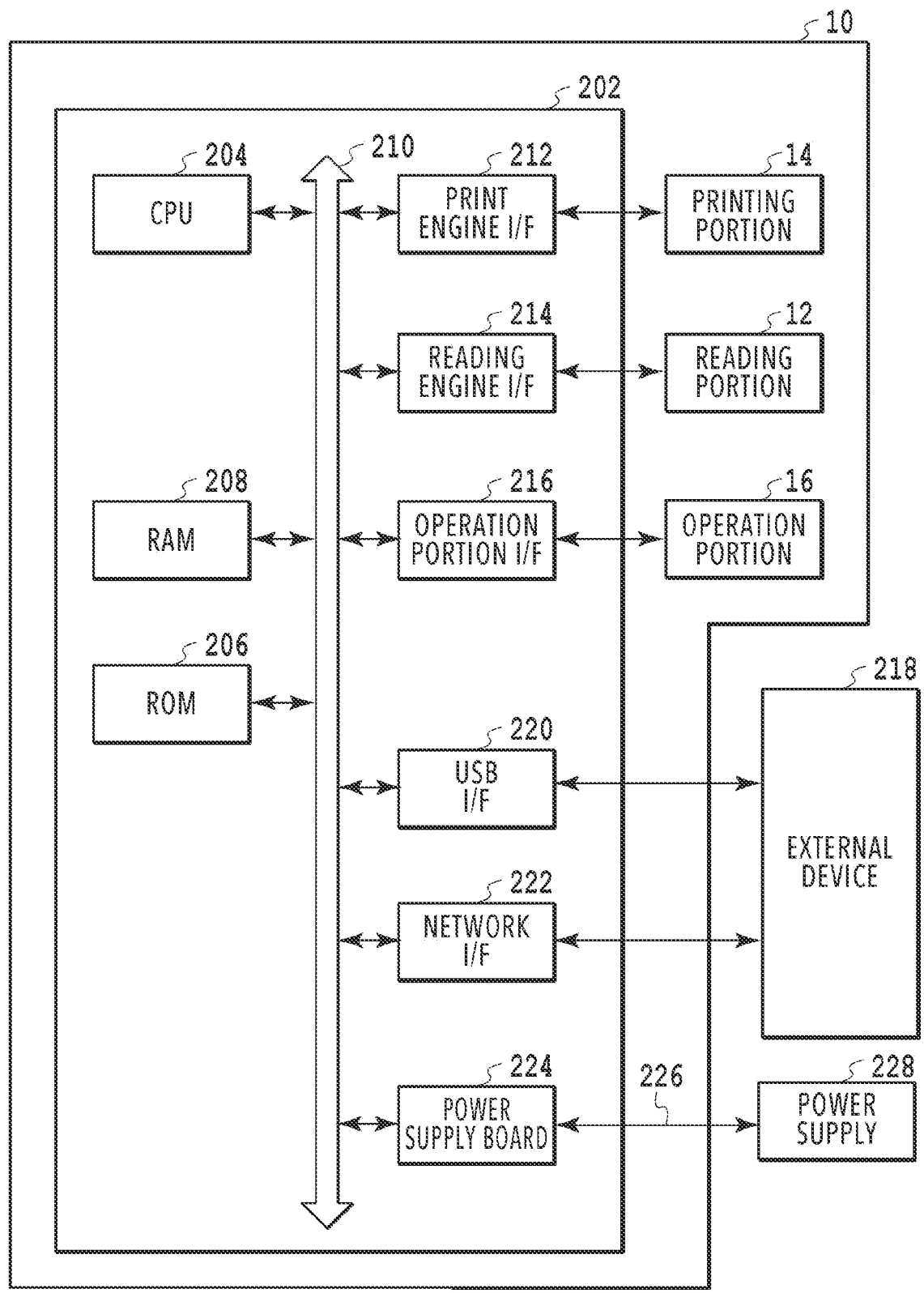
FIG. 2 is a block diagram showing a hardware configuration of the image processing apparatus.

Next, a hardware configuration of the image processing apparatus 10 will be described. FIG. 2 is a block diagram showing the hardware configuration of the image processing apparatus 10.

The image processing apparatus 10 includes the control portion 202 that controls the overall operation. The control portion 202 includes a CPU 204, a ROM 206, and a RAM 208. The CPU 204 expands a control program stored in the ROM 206 into the RAM 208, reads the control program as appropriate, and performs power-on control and various kinds of control. The ROM 206 stores image data, various programs, and various kinds of setting information. It should be noted that the ROM 206 may be, for example, a flash storage or an auxiliary storage device such as a hard disk, and various publicly known techniques can be used. The RAM 208 is a main storage memory of the CPU 204 and is used as a temporary storage area for expanding the various programs stored in a work area or the ROM 206.

In the present embodiment, the control portion 202 executes various processes including processes shown in flowcharts to be described later by one CPU 204 using one memory (RAM 208), but may be in another mode. For example, a plurality of CPUs and a plurality of RAMs, ROMs, and storages may cooperate to execute each process. Alternatively, a hardware circuit may be used to execute a portion of the processes.

In the control portion 202, the CPU 204 is connected via a bus 210 to a print engine interface (I/F) 212 for driving the printing portion 14. As a result, the CPU 204 controls driving of the printing portion 14 via the print engine I/F 212. In the control portion 202, the CPU 204 is connected via the bus 210 to a reading engine I/F 214 for driving the reader 12. As a result, the CPU 204 controls driving of the reader 12 via the reading engine I/F 214. Further, in the control portion 202, the CPU 204 is connected via the bus 210 to an operation portion I/F 216 for receiving display control on the operation portion 16 and input information from the operation portion 16. As a result, the CPU 204 controls display contents on the operation portion 16 via the operation portion I/F 216, receives information input by a user on the operation portion 16, and executes corresponding processing based on the information.

In the control portion 202, the CPU 204 is connected via the bus 210 to a USB I/F 220 and a network I/F 222 for controlling connection with an external device 218 such as a host computer or a contract server 402 (to be described later). Further, in the control portion 202, the CPU 204 is connected to a power supply board 224 via the bus 210. The power supply board 224 transforms power supplied from a power supply 228 connected via a cable 226 and supplies the transformed power to the image processing apparatus 10. It should be noted that the power supply board 224 may include a battery capable of storing power.

Software Configuration of the Image Processing Apparatus

Figure 3:
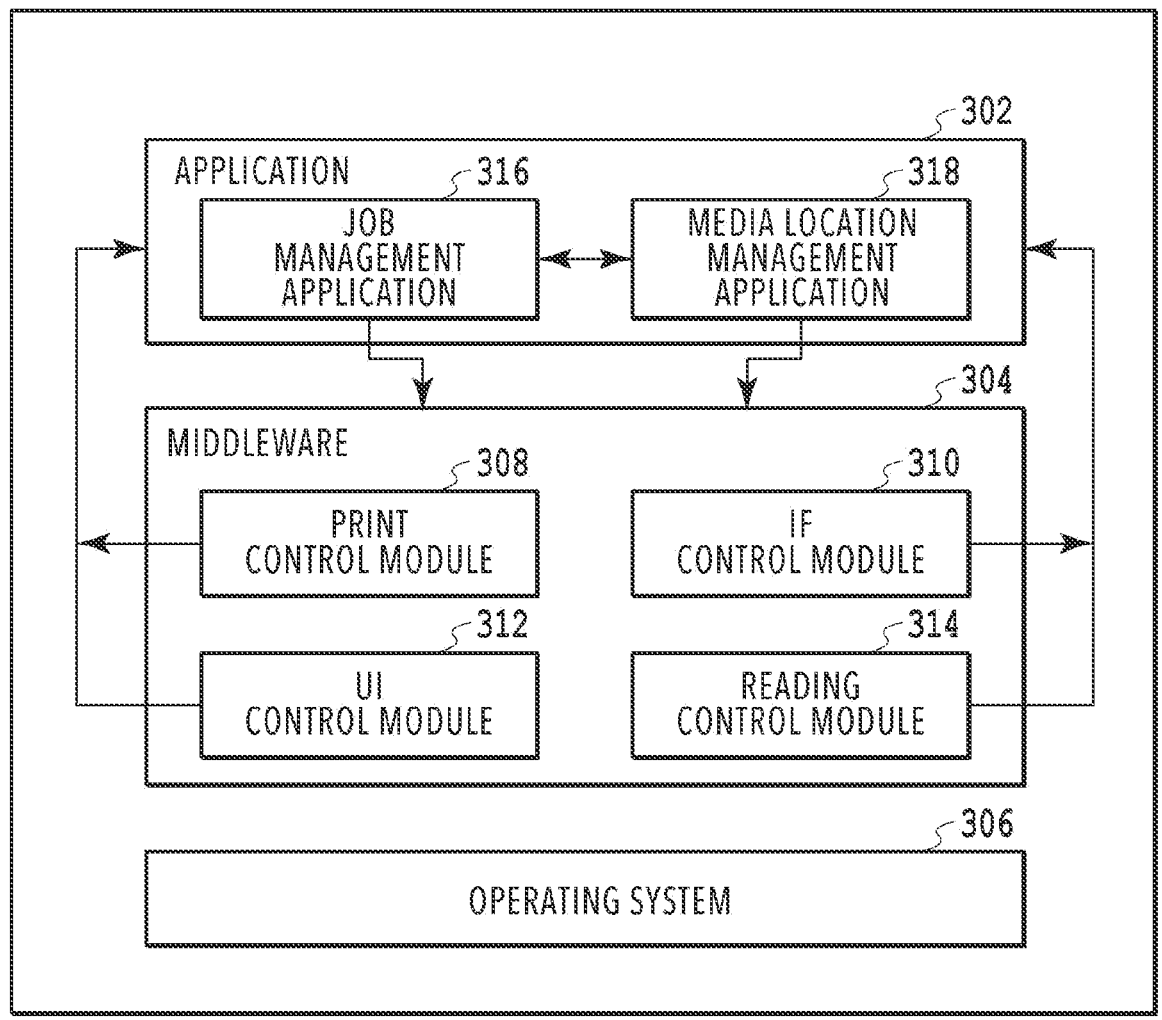
FIG. 3 is a block diagram showing a software configuration of the image processing apparatus.

Next, a description will be given of a software configuration of the image processing apparatus 10, that is, a software configuration of the control program expanded in the RAM 208 for controlling each constituent. FIG. 3 is a block diagram showing a software configuration of the control program to be executed by the image processing apparatus 10. The software configuration of the control program is roughly divided into three blocks and is specifically divided into an application layer 302 that manages an application, a middleware layer 304 for controlling each constituent via various I/Fs, and an operating system 306 that manages the overall control. The operating system 306 provides a basic function for executing the control program by the control portion 202.

The middleware layer 304 includes a software group that controls an I/F to an image processing apparatus or a physical device. In the present embodiment, the middleware layer 304 includes a print control module 308 as a module for controlling the print engine I/F 212. The middleware layer 304 also includes an I/F control module 310 as a module for controlling the USB I/F 220 and network I/F 222 used for communication with the external device 218. The middleware layer 304 further includes a UI control module 312 as a module for controlling the operation portion I/F 216. Furthermore, the middleware layer 304 also includes a reading control module 314 as a module for controlling the reading engine I/F 214.

The application layer 302 includes a job management application 316 and a media location management application 318. The application layer 302 implements a function such as printing to be provided to a user by the image processing apparatus 10 by operating each device via the middleware layer 304. For example, in response to the UI control module 312 receiving selection of a predetermined function or the like by a user on the operation portion 16, the application layer 302 is notified that the selection has been received. The application layer 302 then executes processing corresponding to the selected function with the job management application 316 based on the notification. Specifically, in a case where the UI control module 312 has received selection of a printing function or a maintenance function on the operation portion 16, the job management application 316 uses the print control module 308 of the middleware layer 304 to control the printing portion 14 via the print engine I/F 212 and perform print processing or maintenance processing. The application layer 302 also causes the operation portion 16 to display a function executable by the image processing apparatus 10 via the middleware layer 304. For example, the job management application 316 uses the UI control module 312 to display, on the operation portion 16, a screen (corresponding to a home screen and a menu screen to be described later) that displays the executable function in response to a user's operation or the like on the operation portion 16.

The media position management application 318 notifies the print control module 308 of the middleware layer 304 of media information acquired from the job management application 316. The print control module 308 controls the printing portion 14 according to the media information to acquire position information on the print medium M. In a case where there is no print medium M, the UI control module 312 is controlled to notify the user via the operation portion 16 to reload the print medium M.

Image Processing System

Figure 4:
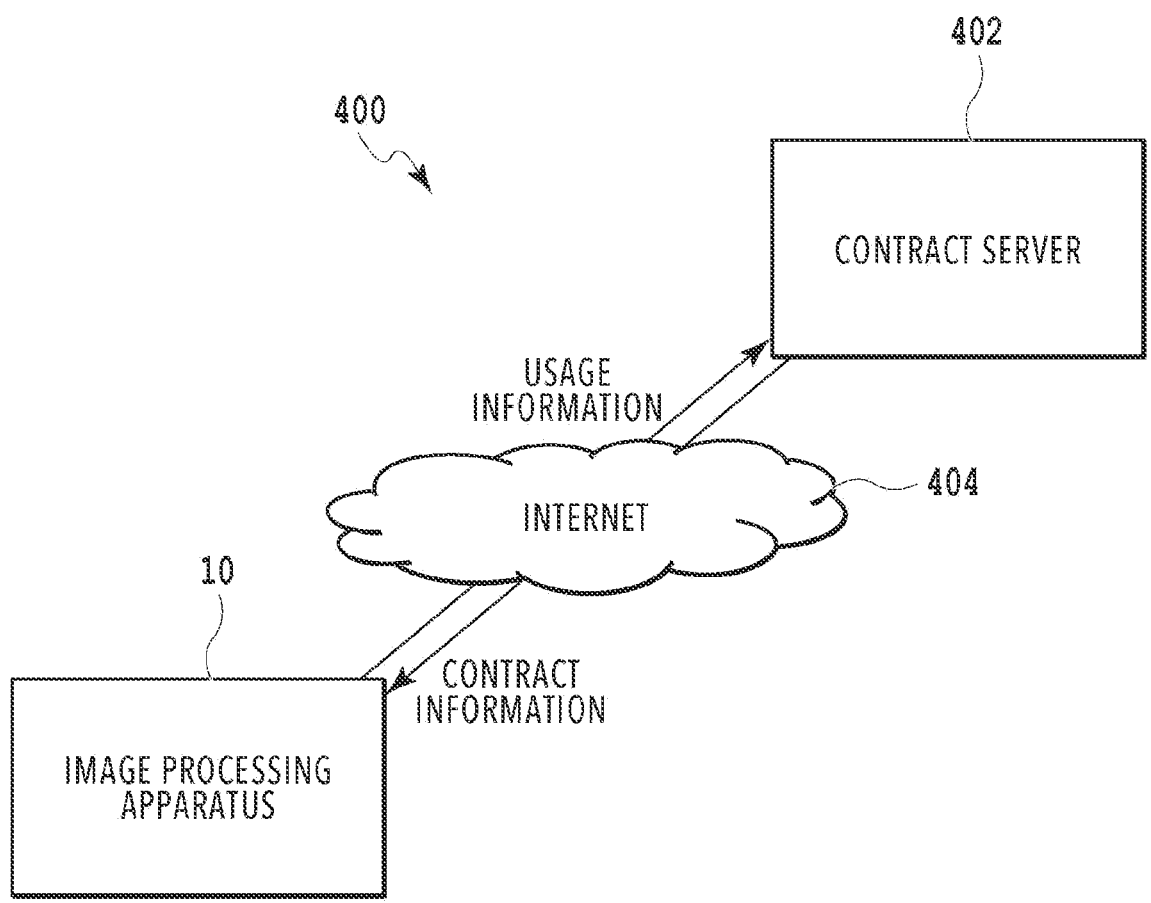
FIG. 4 is a schematic configuration diagram of an image processing system including the image processing apparatus.

Next, an image processing system including the image processing apparatus 10 will be described. FIG. 4 is a schematic configuration diagram of an image processing system including the image processing apparatus 10. An image processing system 400 includes the image processing apparatus 10, a contract server 402 that manages contract-related information and usage information, and a network 404 such as the Internet for connecting the image processing apparatus 10 and the contract server 402. Incidentally, in FIG. 4, the contract server 402 is connected to one image processing apparatus 10 to facilitate understanding. However, in the image processing system 400, the contract server 402 may manage a plurality of image processing apparatuses 10.

In the image processing apparatus 10, the application layer 302 periodically receives information on a subscription contract concluded by the user of the image processing apparatus 10 (also referred to herein as "contract-related information") from the contract server 402. As described above, in the present embodiment, the CPU 204 that causes the application layer 302 to function functions as an acquisition portion that acquires contract-related information.

The received contract-related information is stored in the ROM 206 in a non-volatile manner. The contract-related information periodically received from the contract server 402 includes, for example, a contract start date and time, a contract end date and time, and a monthly account date and time. The application layer 302 also acquires the current date and time from the contract server 402 as required. The format of the current date and time conforms to, for example, ISO8601 (yyyy-MM-ddTHH:mm:ssZ). Acquiring the current date and time from the contract server 402 makes it possible to uniformly manage, for example, the dates and times of the plurality of image processing apparatuses 10 connected to the contract server 402. Incidentally, it is assumed that the information included in the contract-related information periodically received from the contract server 402 is a contract start date and time, a contract end date and time, and an account date and time. However, it may be, for example, a contract start day, a contract end day, and an account day without including time information. In other words, the information may be only on the years, months, and days of a contract start, contract end, and settlement of accounts.

As described above, in the present embodiment, the subscription contract is a contract in which paying a flat monthly rate allows the use of each function of the image processing apparatus, such as printing or duplication, up to the predetermined set number of sheets and makes automatic delivery of consumables such as a cartridge containing ink. Thus, the image processing system 400 is configured such that the image processing apparatus 10 receives contract-related information from the contract server 402 and also sends usage information such as the number of used print media and the amount of ink remaining to the contract server 402. That is, the contract server 402 manages use states such as the number of printed sheets and the amount of ink in the printing apparatus 10. That is, the image processing apparatus 10 is configured such that at the time of the end of processing including printing or the like, the application layer 302 sends, for example, the number of sheets printed in the processing and the amount of ink remaining after the processing as usage information to the contract server 402. It should be noted that the time of transmitting usage information and the contents of usage information are not limited to those described above.

In the image processing apparatus 10, in a case where the number of sheets printed during a predetermined period reaches the predetermined number of printed sheets, the use of various functions including printing is restricted. Information for restricting the use of a function based on a contract, that is, the number of sheets that can be printed during a predetermined period (corresponding to the predetermined number of printed sheets described above) is included in the contract-related information. Hereinafter, information for restricting the use of a function based on a contract will be referred to as "contract information." In the present embodiment, the contract information is "the contracted number of sheets," which is the number of sheets that can be printed during a predetermined period based on a contract. Accordingly, the image processing apparatus 10 is connected to the contract server 402 via a network during the use of a function, and acquires, for example, the number of sheets printed during a predetermined period included in usage information and the upper limit (contracted number of sheets) of the number of printed sheets set under a contract and included in the contract-related information. In a case where the number of sheets printed during a predetermined period reaches the upper limit of the number of printed sheets set under the contract during execution of a function, the use of the function is restricted.

In the present embodiment, a setting is made such that in a state where the image processing apparatus 10 and the contract server 402 cannot be connected via the network 404, that is, in a communication disabled state, a printing that is counted as the number of printed sheets set under the subscription contract cannot be executed. However, printing by the image processing apparatus 10 being restricted while the image processing apparatus 10 cannot communicate with the contract server 402 for some reason not attributable to a user causes considerable inconvenience to a user. For this reason, in the present embodiment, in a state where the image processing apparatus 10 and the contract server 402 cannot communicate with each other, printing can be performed for the predetermined set number of sheets. It should be noted that the set number of sheets is set in advance and stored, for example, in a storage area of the image processing apparatus 10. That is, in the image processing apparatus 10, in a state where communication with the contract server 402 is impossible, printing can be performed until the number of printed sheets in the communication disabled state reaches the set number of sheets. In a case where the number of printed sheets in the communication disabled state reaches the set number of sheets, the application layer 302 is configured to restrict the use of a function being executed. As described above, the set number of sheets is setting information for restricting the use of a function based on a setting.

It should be noted that the number of sheets printed in the communication disabled state is managed by the image processing apparatus 10. Specifically, the number of sheets printed in the communication disabled state is stored in the storage area of the image processing apparatus 10. After that, the number of printed sheets is output to the contract server 402 in a state where communication with the contract server 402 is possible, and the number of printed sheets stored in the storage area is initialized. The contract server 402 adds, for example, the input number of printed sheets to the number of printed sheets managed as usage information. Whether the image processing apparatus 10 and the contract server 402 are in a communication state where the two can communicate with each other via the network 404 is detected, for example, by the application layer 302, and the application layer 302 varies the type of a function restriction to be applied based on a detection result.

Screen Displayed on the Operation Portion

Figure 5:
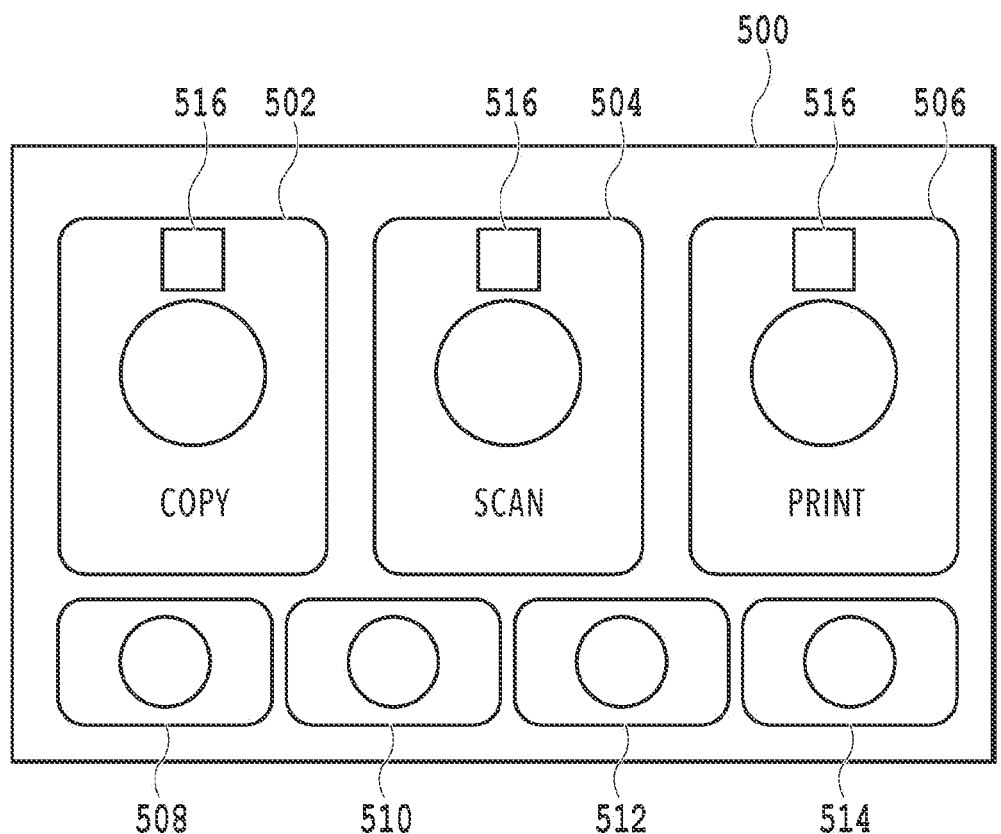
FIG. 5 is a diagram showing an example of a home screen.
Figure 6A:
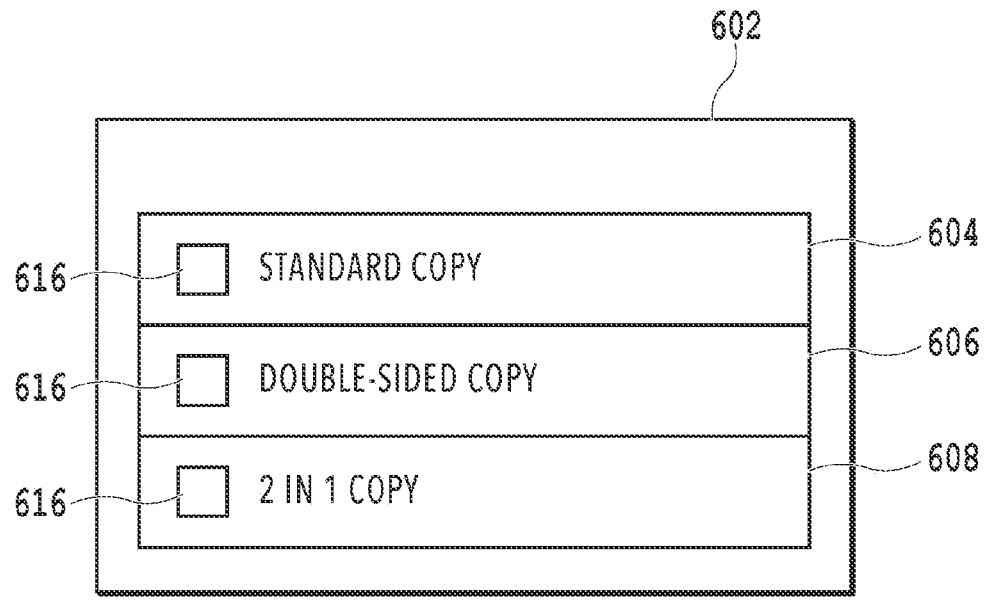
FIGS. 6A and 6B are diagrams showing examples of menu screens.
Figure 6B:
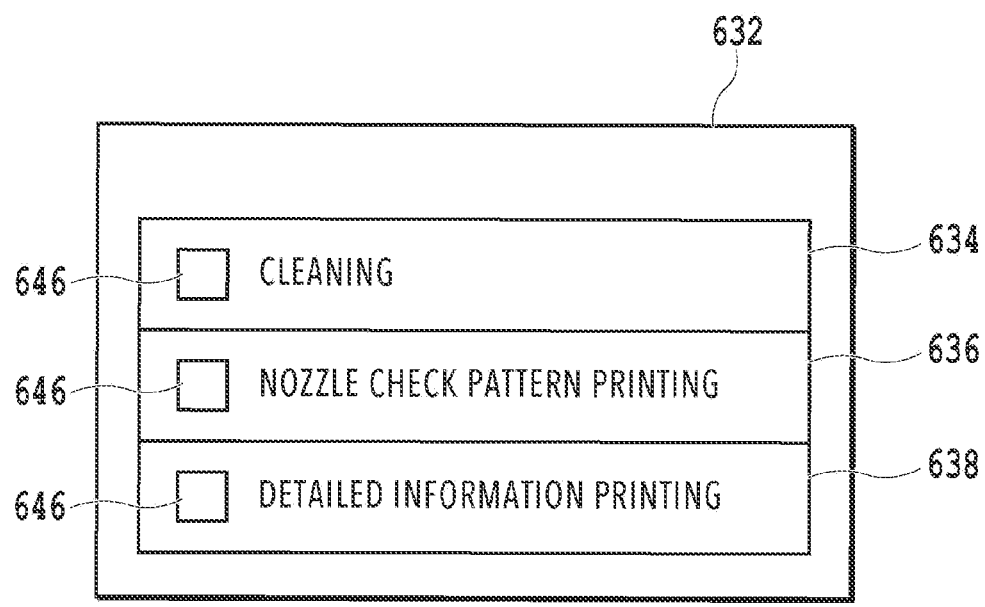

In the case of using the image processing apparatus 10 in the image processing system 400, the image processing apparatus 10 is activated to select a function to be used via a home screen displayed on the operation portion 16. Depending on the selected function, a function to be used is selected via a menu screen showing a more detailed function (detailed function). FIG. 5 is a diagram showing an example of the home screen displayed on the operation portion 16. FIGS. 6A and 6B are diagrams showing an example of the menu screen displayed on the operation portion 16. FIG. 6A is a copy menu screen displayed by pressing a copy menu button 502 on the menu screen in FIG. 5. FIG. 6B is a maintenance menu screen displayed by pressing a maintenance button 514 on the menu screen in FIG. 5.

The home screen 500 displays the copy menu button 502 for reading and printing, that is, duplicating a document placed on the platen 18, and the scan menu button 504 for reading a document placed on the platen 18. The home screen 500 also displays a print menu button 506 for performing printing based on image data, a LAN button 508 for setting a LAN, and a wireless connection button 510 for setting up wireless communication. The home screen 500 further displays a setting button 512 for making various settings and a maintenance button 514 for executing maintenance processing. A user selects a button corresponding to each function displayed on the home screen 500, so that a menu screen corresponding to each function is displayed. Incidentally, an icon or illustration indicating each function may be displayed on a button corresponding to each function.

On each of the copy menu button 502, scan menu button 504, and print menu button 506 displayed on the home screen 500, a state display icon 516 indicating the state of a corresponding function is displayed. The state of a function is a state relating to the use of the function, and is, for example, whether there is a function restriction, the type of function restriction according to a communication state, and availability based on the function restriction. Whether there is a function restriction means whether there is a restriction on the use of a function. The type of function restriction according to a communication state means the type of restriction on a function to be applied according to the communication state. Further, the availability based on the function restriction means availability based on a restriction on the function to be applied. It should be noted that the state of a function is not limited to them, and any information that can increase user convenience in the image processing apparatus 10 by being recognized by the user may be used to use the function. That is, the state display icon 516 is an icon indicating whether each function is available.

In the subscription contract according to the present embodiment, paying a flat monthly rate allows the use of each function of the image processing apparatus, such as printing or duplication, up to the predetermined number of sheets. Thus, the presence or absence of a function restriction in the present embodiment is determined based on a communication state and contract-related information. In the present embodiment, printing can be performed up to the contracted number of sheets in a state where the image processing apparatus 10 and the contract server 402 can communicate with each other, and printing can be performed up to the set number of sheets in the communication disabled state. Thus, the types of function restrictions according to a communication state are a function restriction based on the contracted number of sheets (contract information) and a function restriction based on the set number of sheets (setting information). Further, the availability based on a function restriction means availability according to the contracted number of sheets and availability according to the set number of sheets.

In a case where, for example, the copy menu button 502 is selected on the home screen 500, the CPU 204 (application layer 302) determines that a duplication function is selected, and displays the copy menu screen 602, which is a detailed menu screen for the duplication function, on the operation portion 16. Further, in a case where, for example, the maintenance button 514 is selected, the CPU 204 determines that a maintenance function is selected, and displays a maintenance menu screen 632, which is a detailed menu screen for the maintenance function, on the operation portion 16. In the following description, a menu screen displayed in a case where the copy menu button 502 or the maintenance button 514 is selected will be described as an example of the description of the menu screen. Thus, in the present embodiment, even in a case where another button on the home screen 500 is selected, a corresponding menu screen is displayed.

The copy menu screen 602 displays menu buttons indicating copy functions executable by the image processing apparatus 10 regardless of contract details or a communication state. Specifically, there are displayed, for example, a standard copy button 604 for making a copy under standard conditions, a double-sided copy button 606 for making a copy on both sides of the print medium M, and a 2-in-1 copy button 608 for copying an image for two pages of an original onto one print medium M. In a case where each button is selected, an execution screen for executing a corresponding function is displayed on the operation portion 16. Incidentally, since the execution screen is a publicly known screen, detailed description thereof will be omitted. Further, on each of the standard copy button 604, double-sided copy button 606, and 2-in-1 copy button 608 displayed on the copy menu screen 602, a state display icon 616 is displayed. The state display icon 616 indicates the state of a corresponding function in the same manner as the state display icon 516.

The maintenance menu screen 632 displays menu buttons indicating maintenance functions executable by the image processing apparatus 10 regardless of contract details or a communication state. Specifically, there are displayed, for example, a cleaning button 634 for executing maintenance processing for the print head 34 and a nozzle check pattern print button 636 for printing a pattern for checking an ink ejection state. There is also displayed a detailed information print button 638 for printing information including detailed information on the subscription contract in the image processing apparatus 10. In a case where each button is selected, an execution screen for executing a corresponding function is displayed on the operation portion 16. Incidentally, since the execution screen is a publicly known screen, detailed description thereof will be omitted. Further, on each of the cleaning button 634, nozzle check pattern print button 636, and detailed information print button 638 displayed on the maintenance menu screen 632, a state display icon 646 is displayed. The state display icon 646 indicates the state of a corresponding function in the same manner as the state display icon 516.

As described above, in the present embodiment, the operation portion 16 displays various functions executable by the image processing apparatus 10 and functions as a display portion that displays state display icons indicating the states of the functions in correspondence with these functions.

State Display Icon

Next, the state display icons 516 and 646 and a state display icon 626 displayed on each button on the home screen 500 and the menu screen will be described. FIGS. 7A to 7F are diagrams for explaining examples of the state display icons 516, 626, and 646. FIG. 7A is a diagram showing examples of symbols used for state display icons, and FIGS. 7B to 7F are diagrams showing state display icons displayed using the symbols in FIG. 7A.

In the present embodiment, state display icons are represented by four symbols "●," "○," "□," and "x" (see FIG. 7A) and are displayed based on the state of a function as described above. Specifically, "●" indicates that a corresponding function is available without restriction. "○" indicates that a corresponding function corresponds to a state where the state of connection with the contract server 402 is normal, that is, where communication with the contract server 402 is possible. "☐" indicates that a corresponding function corresponds to a state where the state of connection with the contract server 402 is abnormal, that is, where communication with the contract server 402 is impossible. "x" indicates being unavailable. That is, whether a corresponding function is available is indicated by the presence or absence of "x." The state display icons displayed on the home screen and the menu screen will be described below using these four symbols.

In a case where a corresponding function can be used without restriction regardless of contract details, a communication state, and the like, "●" is used as a state display icon (see FIG. 7B). That is, a user can recognize that the function is available without restriction by referring to the state display icon "●" For example, in the process of printing detailed information, which is a function corresponding to the detailed information print button 638 on the maintenance menu screen 632, information including the detailed information on the subscription contract is printed. The detailed contract information can be printed based on the contract-related information stored in the storage area of the image processing apparatus 10 even in a state where the image processing apparatus 10 cannot communicate with the contract server 402. The information including the detailed contract information can also be printed even in a case where the contracted number of sheets set in the contract is exceeded. Thus, "●" indicating that a corresponding function can be used without restriction is used as the state display icon 646 displayed on the detailed information print button 638 on the maintenance menu screen 632.

In a case where the image processing apparatus 10 is normally connected to the contract server 402, that is, the image processing apparatus 10 can communicate with the contract server 402, "○" is selected (see FIGS. 7C and 7D). Specifically, "○" is used in a state where the usage information on the image processing apparatus 10 is normally managed in the contract server 402 through communication between the image processing apparatus 10 and the contract server 402.

In a case where it is determined based on the management information in the contract server 402 that the number of sheets printed during a predetermined period in the image processing apparatus 10 has not reached the contracted number of sheets, "○" is continuously used as a state display icon (see FIG. 7C). That is, this state display icon indicates that a corresponding function has not met contractual restriction conditions and can be used. Accordingly, a user can recognize that the function is available up to the contracted number of sheets by referring to the state display icon "○."

On the other hand, in a case where it is determined based on the management information in the contract server 402 that the number of sheets printed during a predetermined period in the image processing apparatus 10 has reached the contracted number of sheets, "x" superimposed on "○" is displayed as a state display icon (see FIG. 7D). That is, this state display icon indicates that a corresponding function has met the contractual restriction conditions and cannot be used. Thus, a user can recognize that the function is used up to the contracted number of sheets and thus cannot be used by referring to the symbol in which "x" is superimposed on "○" as a state display icon.

In a case where the image processing apparatus 10 is not connected to the contract server 402, that is, the image processing apparatus 10 cannot communicate with the contract server 402, "☐" is selected (see FIGS. 7E and 7F). Specifically, "☐" is used in a state where the usage information on the image processing apparatus 10 cannot be normally managed in the contract server 402 through communication between the image processing apparatus 10 and the contract server 402.

In a case where it is determined based on the management in the image processing apparatus 10 (the CPU 204 and the job management application 316) that the number of printed sheets in the communication disabled state has not reached the set number of sheets, "☐" is continuously used as a state display icon (see FIG. 7E). It should be noted that the set number of sheets is the number of sheets that can be printed in the communication disabled state as described above. That is, this state display icon indicates that a corresponding function has not met restriction conditions in the communication disabled state and can be used. Accordingly, a user can recognize that the function is available up to the set number of sheets by referring to the state display icon "☐".

On the other hand, in a case where it is determined based on the management by the image processing apparatus 10 that the number of printed sheets in the communication disabled state has reached the set number of sheets, "x" superimposed on "☐" is displayed as a state display icon (see FIG. 7F). That is, this state display icon indicates that a corresponding function has met restriction conditions in the communication disabled state and cannot be used. Accordingly, a user can recognize that the function is used up to the set number of sheets and thus cannot be used by referring to the symbol in which "x" is superimposed on "☐" as a state display icon.

Process of Setting a State Display Icon

Next, a description will be given of a setting process of setting the state display icons 516, 616, and 646. In a case where a screen including buttons on which state display icons are displayed is displayed on the operation portion 16, the setting process of setting a state display icon is executed. Here, for each button on the home screen and the menu screen, a setting is made as to whether to display a state display icon. Thus, the CPU 204 executes the setting process for each button for which a setting for displaying a state display icon has been made out of the buttons on the screens displayed on the operation portion 16. On a screen on which a button corresponding to a function is displayed, the state display icon set by this setting process is displayed in a position corresponding to the button by the CPU 204.

Figure 8:
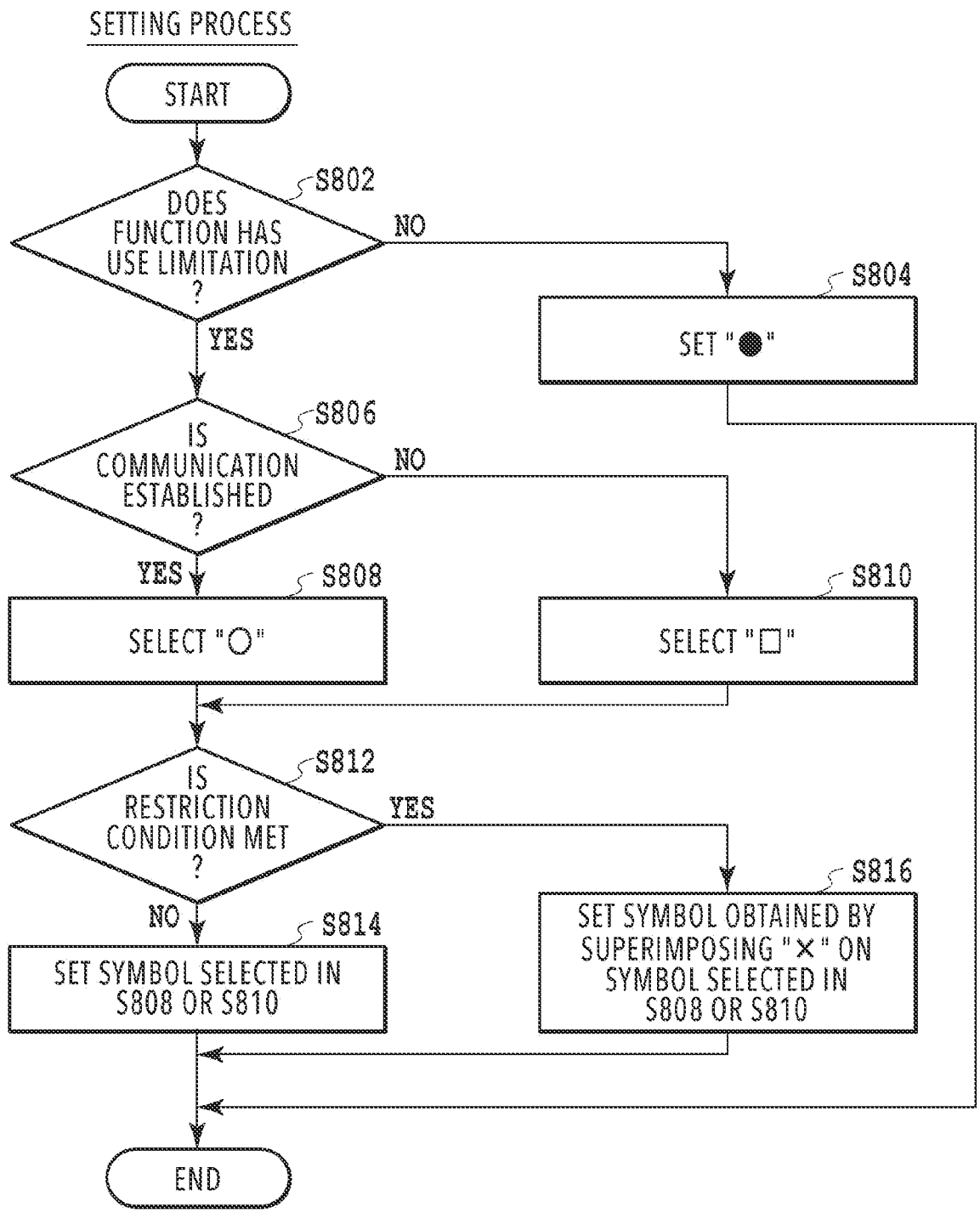
FIG. 8 is a flowchart showing detailed processing contents of a setting process.

FIG. 8 is a flowchart showing the detailed contents of the setting process of setting a state display icon to be displayed. A series of steps shown in the flowchart in FIG. 8 is performed by the CPU 204 expanding the program code stored in the ROM 206 into the RAM 208 and executing the program code. Alternatively, a portion or all of the functions of the steps in FIG. 8 may be executed in hardware such as an ASIC or electrical circuit. It should be noted that the symbol S in the description of each step means a step in the flowchart. The process of the present flowchart is started based on the power of the image processing apparatus 10 being turned on (power being supplied to the image processing apparatus 10).

After the start of the setting process, the CPU 204 first determines in S802 whether a function associated with a button is a function with use limitations. In S802, it is determined whether the use of the function corresponding to the button is limited due to a communication state, subscription contract, or the like. In the present embodiment, the image processing apparatus 10 periodically acquires contract-related information, and the acquired contract-related information is stored in the storage area. Thus, in S802, whether there are use limitations due to a subscription contract is determined by determining, for example, whether the contract-related information includes use limitations relating to the function. Further, whether there are use limitations due to a communication state is determined based on, for example, whether the function is available regardless of the communication state. It should be noted that in S802, whether the function has use limitations may be determined based only on whether its use is limited due to the subscription contract, or whether the function has use limitations may be determined based on another condition.

In a case where the CPU 204 determines in S802 that the function has no use limitations, the process proceeds to S804, and the CPU 204 sets "●" as a state display icon corresponding to a button indicating the function that is determined to have no use limitations (FIG. 7B). After that, the CPU 204 finishes the setting process shown in the flowchart in FIG. 8. On the other hand, in a case where the CPU 204 determines in S802 that the function has use limitations, the process proceeds to S806, and the CPU 204 determines whether communication with the contract server 204 is successfully established.

In S806, for example, a signal is transmitted and received between the image processing apparatus 10 and the contract server 402 to check whether communication is normally and successfully established. Incidentally, the method of checking a state of communication between the image processing apparatus 10 and the contract server 402 is not limited to the method described above, and various publicly known techniques can be used. In a case where the image processing apparatus 10 does not manage usage information, that is, in a case where it does not hold the total number of sheets printed during a predetermined period (the number of sheets printed during the predetermined period), in S806, management information in the contract server 402 is acquired in a case where communication is possible. The management information to be acquired is, for example, the contracted number of sheets and the total number of printed sheets. It should be noted that the management information to be acquired may be any information as long as it can be used to determine whether the image processing apparatus 10 has performed printing up to the contracted number of sheets. Accordingly, in this case, in S806, it may also be determined whether communication with the contract server 402 is successfully established based on whether management information has been successfully acquired from the contract server 402.

In a case where the CPU 204 determines in S806 that communication with the contract server 402 is successfully established, the process proceeds to S808, and the CPU 204 selects "○" indicating that the usage information on the image processing apparatus 10 can be normally managed in the contract server 402. On the other hand, in a case where the CPU 204 determines in S806 that communication with the contract server 402 has not been successfully established, the process proceeds to S810, and the CPU 204 selects indicating that the usage information on the image processing apparatus 10 cannot be normally managed in the contract server 402.

After the completion of the selection in S808 or S810, the process then proceeds to S812 and the CPU 204 determines whether the restriction conditions are met. In a case where "○" is selected in S808, it is determined in S812 whether the contracted number of sheets (contract information) which is a contractual restriction condition has been reached. Specifically, the determination is made by comparing the total number of sheets printed during a predetermined period with the contracted number of sheets. Thus, in this case, it is determined that the restriction conditions are met in a case where the total number of printed sheets has reached the contracted number of sheets, and it is determined that the restriction conditions are not met in a case where the total number of printed sheets has not reached the contracted number of sheets.

Further, in a case where "□" is selected in S810, it is determined in S812 whether the set number of sheets (setting information) which is a restriction condition in the communication disabled state has been reached. Specifically, the determination is made by comparing the total number of sheets printed in the communication disabled state with the set number of sheets managed by the image processing apparatus 10. Thus, in this case, it is determined that the restriction conditions are met in a case where the total number of printed sheets has reached the set number of sheets, and it is determined that the restriction conditions are not met in a case where the total number of printed sheets has not reached the set number of sheets.

In a case where the CPU 204 determines in S812 that the restriction conditions are not met, the process proceeds to S814 and the CPU 204 sets the symbol selected in S808 or S810 as a state display icon and finishes the setting process shown in the flowchart in FIG. 8. That is, in a case where "○" is selected in S808, "○" is set as a state is selected in S814, "□" display icon in S814 (see FIG. 7C). In a case where "□" is set as a state display icon in S814 (see FIG. 7E). On the other hand, in a case where the CPU 204 determines in S812 that the restriction conditions are met, the process proceeds to S816, and the CPU 204 sets a symbol in which "x" is superimposed on the symbol selected in S808 or S810 as a state display icon. After that, the CPU 204 finishes the setting process shown in the flowchart in FIG. 8. That is, in a case where "○" is selected in S808, a symbol in which "x" is superimposed on "○" is set as a state display icon in S816 (see FIG. 7D). In a case where "□" is selected in S810, a symbol in which "x" is superimposed on "□" is set as a state display icon in S816 (see FIG. 7F).

It should be noted that the CPU 204 executes the process in the flowchart in FIG. 8 for each function displayed on the home screen 500 and each function displayed on the menu screen 600. Specifically, the CPU 204 selects one function from the functions displayed on the home screen 500 and the functions displayed on the menu screen 600 and executes the flowchart in FIG. 8 for the selected function. The CPU 204 then determines whether there is an unselected function of the functions displayed on the home screen 500 and the functions displayed on the menu screen 600, and in a case where it is determined that there is an unselected function, the CPU 204 executes the flowchart in FIG. 8 for the function. The CPU 204 then determines whether there is an unselected function, and in a case where it is determined that there is no unselected function, the CPU 204 determines that the state display icon 516 indicating the states of all functions has been set, and each function and the state display icon 516 indicating the state of each function are displayed on the operation portion 16. It should be noted that the flowchart in FIG. 8 may be executed only for a predetermined function, not for all functions among the functions displayed on the home screen 500 and the functions displayed on the menu screen 600.

As described above, in the present embodiment, at the time of opening the home screen 500, the setting process is executed for the copy menu button 502, the scan menu button 504, and the print menu button 506. In a case where the copy menu screen 602 is opened by selecting the copy menu button 502, the setting process is executed for the standard copy button 604, the double-sided copy button 606, and the 2-in-1 copy button 608. As a result, for example, even in a case where the copy menu screen 602 is displayed after a certain period of time has passed after the opening of the home screen 500, the communication state at that time is reflected, so that the state display icon 616 indicates the real-time state of a function.

As described above, in the present embodiment, on a screen displaying a function executable by the image processing apparatus 10, a state display icon indicating the state of a corresponding function is displayed on a display such as a button for selecting each function. More specifically, on the buttons displayed on the screen, the presence or absence of a function restriction, the type of function restriction according to a communication state, and availability based on the function restriction are displayed as state display icons that can be recognized by a user. This allows the user to easily recognize the state of a function to be selected before executing a process using the selected function. Thus, before executing the function to be selected, it is possible to check various settings, a network connection state, and the like and easily recognize a function without restriction, which increases user convenience.

Other Embodiments

The above embodiment may be modified as shown in (1) to (7) below.

(1) In the above embodiment, the states of functions indicated by state display icons are the presence or absence of a function restriction, the type of function restriction according to a communication state, and availability based on the function restriction but are not limited to them. For example, it is possible to add, to the state display icons, information on a remaining amount up to a restriction condition, that is, information on an amount in which a function can be used. In this case, for example, in S812, the CPU 204 compares the total number of printed sheets and a restriction condition and acquires the difference between the total number of printed sheets and the restriction condition. In S814, the CPU 204 then sets a symbol based on a comparison result and sets, as a state display icon, an acquired value shown in a position adjacent to the set symbol.

Figure 9A:
FIGS. 9A and 9B are diagrams showing modified examples of the state display icons.
Figure 9B:

Specifically, in S812, the total number of printed sheets is compared with the contracted number of sheets, and in a case where a value obtained by subtracting total print information from the contract information is, for example, "789," in S814, "789" shown in a position adjacent to "○" is set as a state display icon (see FIG. 9A). As a result, a user can recognize that the function can be used up to the contracted number of sheets and can be used for 789 more sheets by referring to the state display icon in FIG. 9A. Further, in S812, the total number of printed sheets is compared with the set number of sheets, and in a case where a value obtained by subtracting the total number of printed sheets from the set number of sheets is, for example, "6," in S814, "6" shown in a position adjacent to "□" is set as a state display icon (see FIG. 9B). As a result, the user can recognize that the function can be used up to the set number of sheets and can be used for 6 more sheets by referring to the state display icon in FIG. 9B. As described above, including information on a remaining amount up to a restriction condition in a state display icon allows the user to easily and precisely recognize the state of a function. It should be noted that the position of the above value is not limited to the position adjacent to the symbol; for example, the value may be displayed inside the symbol, or may be displayed anywhere as long as a user can recognize that it corresponds to the symbol.

(2) In the above embodiment, a state display icon is displayed on a button for selecting a corresponding function, but the present invention is not limited to this. The state display icon may be displayed in any way as long as it is in a position corresponding to the button and a user can recognize that the button corresponds to the state display icon.

(3) In the above embodiment, symbols, such as "●," "○," "□," and "x," are used as state display icons so that differences in the state of each function can be distinguished. However, the present invention is not limited to this. For example, the state display icons may use a plurality of colors so that the difference in the state of each function can be distinguished, or may be text explaining the state of each function. Alternatively, a state display icon may be displayed by combining at least two of a symbol, color, and text so that the difference in the state of each function can be distinguished. Alternatively, a state display icon may also be presented by providing an indication other than a symbol, color, or text. Alternatively, instead of using a state display icon, for example, using buttons in display forms different in shape, color, and the like may distinguish the difference in the state of each function. The state of each function may be displayed by at least one of, for example, a character string, animation, guidance, and illustration, or a combination thereof, instead of an icon.

(4) In the above embodiment, the state display icon "●" is displayed for a button for a corresponding function available without restriction, but the present invention is not limited to this. There may be no difference in user convenience depending on whether there is a state display icon as long as the corresponding function is available without restriction. Thus, in such a case, a state display icon may not be displayed for a button for a function available without restriction. Accordingly, in this case, the states of functions indicated by state display icons are only the type of function restriction according to a communication state and availability based on the function restriction.

(5) In the above embodiment, the description has been given using the number of printed sheets which is a numerical value corresponding to the number of printing executions as an example of restriction conditions. However, the restriction conditions may be the number of scanned sheets or the amount of ink used which is a numerical value corresponding to the amount of consumables consumed in printing.

(6) In the above embodiment, the description has been given of the technique of displaying a state display icon indicating the state of a function by taking as an example the image processing apparatus capable of executing printing on a print medium, but the present invention is not limited to this. That is, the above technique may be applied to various information processing apparatuses whose functions can be used under a subscription contract. Further, in the above embodiment, the control portion 202 of the image processing apparatus 10 sets a state display icon indicating the state of a function and displays the set state display icon on the operation portion 16 of the image processing apparatus 10. However, the present invention is not limited to this. An external device such as a computer provided separately from the image processing apparatus 10 may set a state display icon.

(7) The above embodiment and the various forms shown in (1) to (6) above may be combined as appropriate.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-187306, filed Nov. 24, 2022, which is hereby incorporated by reference wherein in its entirety.

What is claimed is:

1. An information processing apparatus having a plurality of functions, the information processing apparatus comprising:
one or more processors; and
one or more memories storing instructions that, when executed by the one or more processors, cause the information processing apparatus to function as:
a display unit that displays, on a display portion of the information processing apparatus, a selection screen for selecting the plurality of functions including a first function which is a predetermined function and a second function which is a different predetermined function different from the first function,
wherein the display unit displays information indicating whether the first function is available in a first region for selecting the first function on the selection screen and displays information indicating whether the second function is available in a second region for selecting the second function on the selection screen,
wherein the stored instructions further cause the information processing apparatus to function as a setting unit that sets information indicating whether the predetermined function is available, wherein the setting unit sets, based on information indicating a state of communication between the information processing apparatus and a communicable external device, the information indicating whether the predetermined function is available,
wherein the stored instructions further cause the information processing apparatus to function as:
an acquisition unit configured to acquire, from the external device, information indicating a restriction on the predetermined function,
wherein the setting unit sets the information indicating whether the predetermined function is available based on the information on a condition for the restriction on the predetermined function and the information indicating the state of communication between the information processing apparatus and the communicable external device, and
wherein the setting unit,
in a case where communication with the external device is possible, sets the information indicating whether the predetermined function is available based on the information indicating the condition for the restriction on the predetermined function, and
in a case where communication with the external device is impossible, sets the information indicating whether the predetermined function is available based on information on the restriction on the predetermined function in the case where communication with the external device is impossible.

2. The information processing apparatus according to claim 1, further comprising:
a determination unit configured to determine whether the information processing apparatus can communicate with the external device,
wherein in a case where it is determined that the information processing apparatus can communicate with the external device, the setting unit makes a setting so as to include information indicating that the information processing apparatus can communicate with the external device.

3. The information processing apparatus according to claim 1, wherein the stored instructions further cause the information processing apparatus to function as:
a determination unit configured to determine whether use information on the predetermined function meets the condition for the restriction on the predetermined function,
wherein, in a case where it is determined that the use information on the predetermined function meets the condition for the restriction on the predetermined function, the setting unit makes a setting so as to include information indicating that a use state of the predetermined function meets the condition for the restriction on the predetermined function.

4. The information processing apparatus according to claim 1, wherein
the condition for the restriction is determined based on contract information on use of the information processing apparatus.

5. The information processing apparatus according to claim 1, wherein
the condition for the restriction includes information on an amount in which the predetermined function is available.

6. The information processing apparatus according to claim 5, wherein
the information on the amount in which the predetermined function is available is information indicating a number of executions of the predetermined function.

7. The information processing apparatus according to claim 5, wherein
the information on the amount in which the predetermined function is available is information indicating an amount of consumables consumed during a predetermined period.

8. The information processing apparatus according to claim 1, wherein
the display unit shows information indicating whether the predetermined function is available using at least one of a symbol, color, and text.

9. The information processing apparatus according to claim 1, wherein
the external device is a server managing contract information on use of the information processing apparatus and usage information on the predetermined function.

10. The information processing apparatus according to claim 9, wherein
the predetermined function further comprises at least one of a function of printing the contract information on the use of the information processing apparatus and a maintenance function.

11. The information processing apparatus according to claim 1, wherein
the information indicating the state relating to use of the predetermined function is set based on at least one of information on the use limitation on the predetermined function, information indicating a state of communication with the external device, and the information on the restriction condition.

12. An information processing apparatus having a plurality of functions, the information processing apparatus comprising:
one or more processors; and
one or more memories storing instructions that, when executed by the one or more processors, cause the information processing apparatus to:
display, on a display portion of the information processing apparatus, a selection screen for selecting the plurality of functions relating to at least a copying function,
wherein the displaying displays information indicating whether a first function relating to the copying function of the plurality of functions is available in a first region for selecting the first function relating to the copying function on the selection screen and displays information indicating whether a second function relating to the copying function is available in a second region for selecting the second function relating to the copying function on the selection screen,
wherein the stored instructions further cause the information processing apparatus to function as a setting unit that sets information indicating whether the first function is available, wherein the setting unit sets, based on information indicating a state of communication between the information processing apparatus and a communicable external device, the information indicating whether the first function is available,
wherein the stored instructions further cause the information processing apparatus to function as:
an acquisition unit configured to acquire, from the external device, information indicating a restriction on the first function,
wherein the setting unit sets the information indicating whether the first function is available based on the information on a condition for the restriction on the first function and the information indicating the state of communication between the information processing apparatus and the communicable external device, and
wherein the setting unit,
in a case where communication with the external device is possible, sets the information indicating whether the first function is available based on the information indicating the condition for the restriction on the first function, and
in a case where communication with the external device is impossible, sets the information indicating whether the first function is available based on information on the restriction on the first function in the case where communication with the external device is impossible.

13. The information processing apparatus according to claim 1, wherein the first function is a copying function, and the second function is a scanning function.

14. The information processing apparatus according to claim 1, wherein the information indicating whether the predetermined function is available is information on a condition for a restriction on the predetermined function and information based on information indicating a state of communication between the information processing apparatus and a communicable external device.

15. The information processing apparatus according to claim 14, wherein the information indicating whether the predetermined function is available is a mark.

16. A method of controlling an information processing apparatus having a plurality of functions, the method comprising:
displaying, on a display portion of the information processing apparatus, a selection screen for selecting the plurality of functions including a first function which is a predetermined function and a second function which is a different predetermined function different from the first function,
wherein the displaying displays information indicating whether the first function is available in a first region for selecting the first function on the selection screen and displays information indicating whether the second function is available in a second region for selecting the second function on the selection screen;
setting information indicating whether the predetermined function is available, wherein the setting sets, based on information indicating a state of communication between the information processing apparatus and a communicable external device, the information indicating whether the predetermined function is available; and
acquiring, from the external device, information indicating a restriction on the predetermined function,
wherein the setting sets the information indicating whether the predetermined function is available based on the information on a condition for the restriction on the predetermined function and the information indicating the state of communication between the information processing apparatus and the communicable external device, and
wherein the setting,
in a case where communication with the external device is possible, sets the information indicating whether the predetermined function is available based on the information indicating the condition for the restriction on the predetermined function, and in a case where communication with the external device is impossible, sets the information indicating whether the predetermined function is available based on information on the restriction on the predetermined function in the case where communication with the external device is impossible.

17. A non-transitory computer readable storage medium storing a program for causing a computer to perform a method of controlling an information processing apparatus having a plurality of functions, the method comprising:

displaying, on a display portion of the information processing apparatus, a selection screen for selecting the plurality of functions including a first function which is a predetermined function and a second function which is a different predetermined function different from the first function, wherein the displaying displays information indicating whether the first function is available in a first region for selecting the first function on the selection screen and displays information indicating whether the second function is available in a second region for selecting the second function on the selection screen;

setting information indicating whether the predetermined function is available, wherein the setting sets, based on information indicating a state of communication between the information processing apparatus and a communicable external device, the information indicating whether the predetermined function is available; and acquiring, from the external device, information indicating a restriction on the predetermined function, wherein the setting sets the information indicating whether the predetermined function is available based on the information on a condition for the restriction on the predetermined function and the information indicating the state of communication between the information processing apparatus and the communicable external device, and wherein the setting, in a case where communication with the external device is possible, sets the information indicating whether the predetermined function is available based on the information indicating the condition for the restriction on the predetermined function, and in a case where communication with the external device is impossible, sets the information indicating whether the predetermined function is available based on information on the restriction on the predetermined function in the case where communication with the external device is impossible.

18. The information processing apparatus according to claim 12, wherein the first function is a copying function, and the second function is a double-sided copying function.

* * * * *